United States Patent [19]

Gill

[11] Patent Number: 4,791,730
[45] Date of Patent: Dec. 20, 1988

[54] DIRECTION SENSING DEVICE

[75] Inventor: Michael J. Gill, Milford-on-Sea, England

[73] Assignee: Brookes & Gatehouse, Hampshire, Great Britain

[21] Appl. No.: 14,721

[22] Filed: Feb. 13, 1987

[30] Foreign Application Priority Data

Feb. 13, 1986 [GB] United Kingdom ............... 8603591

[51] Int. Cl.[4] .............................................. G01C 17/38
[52] U.S. Cl. ........................................ 33/361; 33/378; 33/366
[58] Field of Search ............... 33/366, 361, 365, 378, 33/377, 364

[56] References Cited

U.S. PATENT DOCUMENTS 2,500,411 3/1950 Hewitt ................................. 33/378
2,765,541 10/1956 Story .................................... 33/378

FOREIGN PATENT DOCUMENTS

| 059770 | 9/1982 | European Pat. Off. |
| 062947 | 10/1982 | European Pat. Off. |
| 673194 | 6/1952 | United Kingdom |
| 884815 | 8/1960 | United Kingdom |
| 1193916 | 6/1970 | United Kingdom |
| 1302448 | 1/1973 | United Kingdom |
| 2158239 | 11/1978 | United Kingdom |
| 1556406 | 11/1978 | United Kingdom |

Primary Examiner—Harry N. Haroian
Attorney, Agent, or Firm—Remy J. VanOphem

[57] ABSTRACT

A fluxgate compass direction sensor in which a fluxgate is mounted relative to a receptacle by means of a flexible circuit. The fluxgate is also suspended in a liquid by means of a float. In use, if the receptacle tilts relative to the horizontal, the level of the liquid will move to retain a horizontal aspect and the float, being buoyant in the liquid, will retain the fluxgate in the horizontal plane. The flexible circuit acts to allow tilting of the float and fluxgate relative to the receptacle while retaining the fluxgate in lateral and directional alignment relative to the receptacle.

19 Claims, 4 Drawing Sheets

DIRECTION SENSING DEVICE

FIELD OF THE INVENTION

This invention relates to a direction sensing device and more particularly, but not exclusively, to a fluxgate compass.

BACKGROUND OF THE INVENTION

Fluxgate compasses give an indication of the direction of an object in which the compass is installed by sensing the horizontal component of the earth's magnetic field. Fluxgate compasses operate by alternately magnetically saturating a permeable core with a drive coil and detecting, using sensing coils, the asymmetry of the resultant magnetic field, the asymmetry having been caused by the earth's magnetic field.

In order to sense direction accurately, it is necessary both for the fluxgate (coils and core) to be retained in directional alignment relative to the object and also for the fluxgate to be retained horizontally, so that the true horizontal component of the earth's magnetic field is sensed.

In Great Britain Pat. No. 2107057, a suspension assembly for a fluxgate is proposed in which the fluxgate is connected to a supporting frame to be mounted relative to the object, by means of a spherically symmetrical mechanical coupling which permits both tilt and twist. Thus, if the object tilts away from horizontal, the fluxgate will remain, due to its weight, in the horizontal plane. A flexible circuit is provided which both keeps the fluxgate directionally aligned and provides electrical connections thereto.

The largest factor in the cost of this prior art teaching is the mechanism used to support the fluxgate. To a large extent, this mechanism is there to support itself, with the essential mechanism of the fluxgate only being 1/50 of the weight of the whole suspended assembly.

SUMMARY OF THE INVENTION

According to the invention there is provided a direction sensing device including: a receptacle having a liquid received therein; and a direction sensor coupled to the receptacle, the sensor being arranged to be buoyant in the liquid received in the receptacle and to be free to move so as to remain in the horizontal plane but to be in all other respects constrained to follow the movement of the receptacle.

BRIEF DESCRIPTION OF THE DRAWINGS

An embodiment of the invention will now be described, by way of example, with reference to the accompanying drawings in which.

DESCRIPTION OF THE PREFERRED EMBODIMENT

Figure 1:
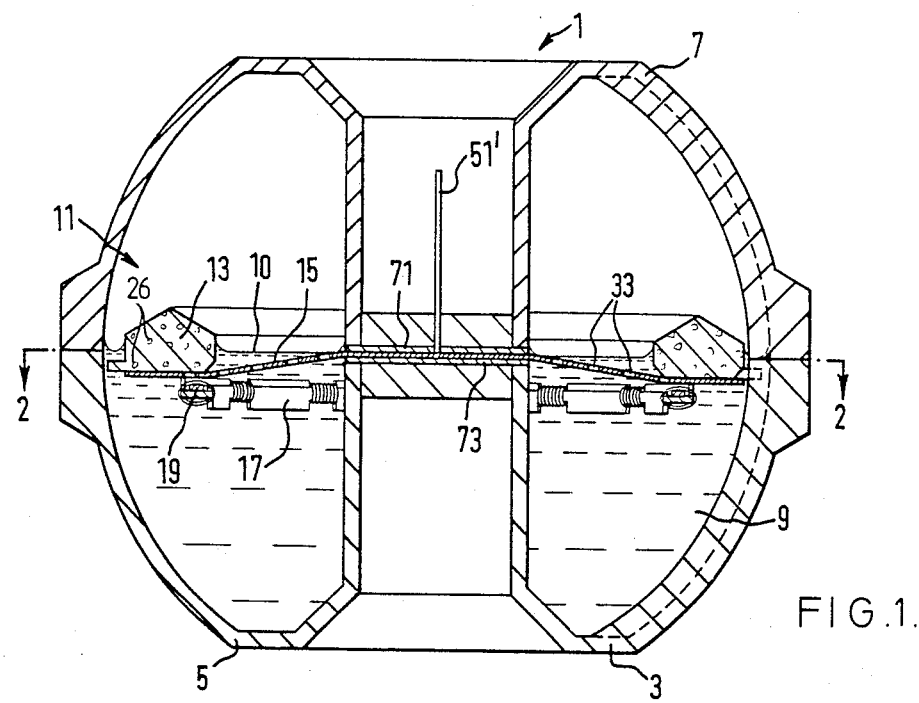
FIG. 1 is a sectional view of an embodiment of the invention.

With reference to FIG. 1, a direction sensing device generally designated 1 is shown which includes a receptacle 3 of hollow, toroidal construction. The receptacle 3 is preferably formed from noryl or acetal resin, although it may alternatively be formed from other plastic materials, for example acrylic or polycarbonate. The receptacle includes two cooperating halves 5, 7 sealed together. The receptacle 3 is filled to approximately half its volume with a liquid 9, which is preferably 50 cs silicone oil. Oil of this viscosity is chosen to give a reasonable amount of dampening.

Figure 5:
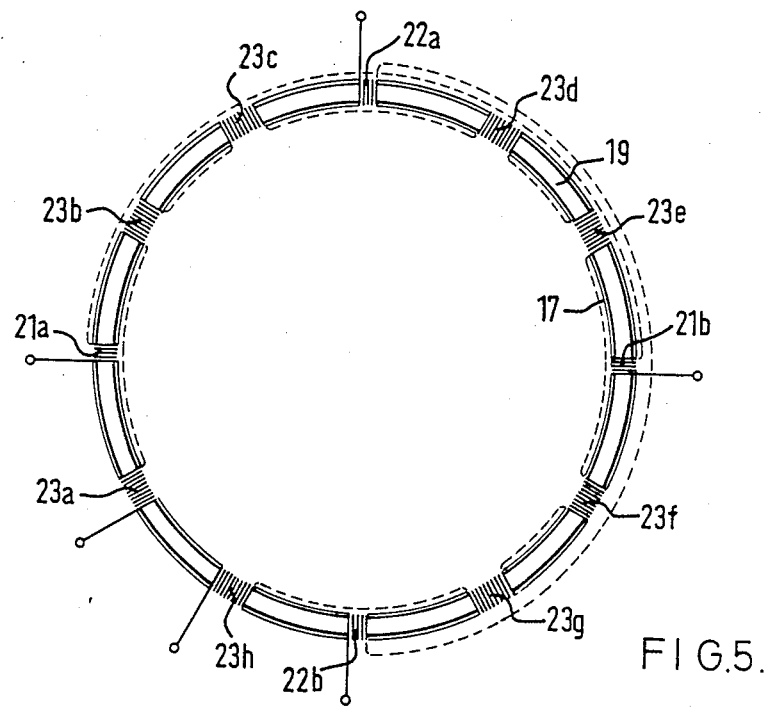
FIG. 5 shows a plan view of the fluxgate of the embodiment of FIGS. 1 to 4.

A direction sensor, generally designated 11, is disposed within the receptacle and includes a float 13, flexible circuit 15 and a fluxgate consisting of a coil former 17 to which a core 19 and coils 21a-b, 22a-b and 23a-h are attached (see FIG. 5).

Figure 3:
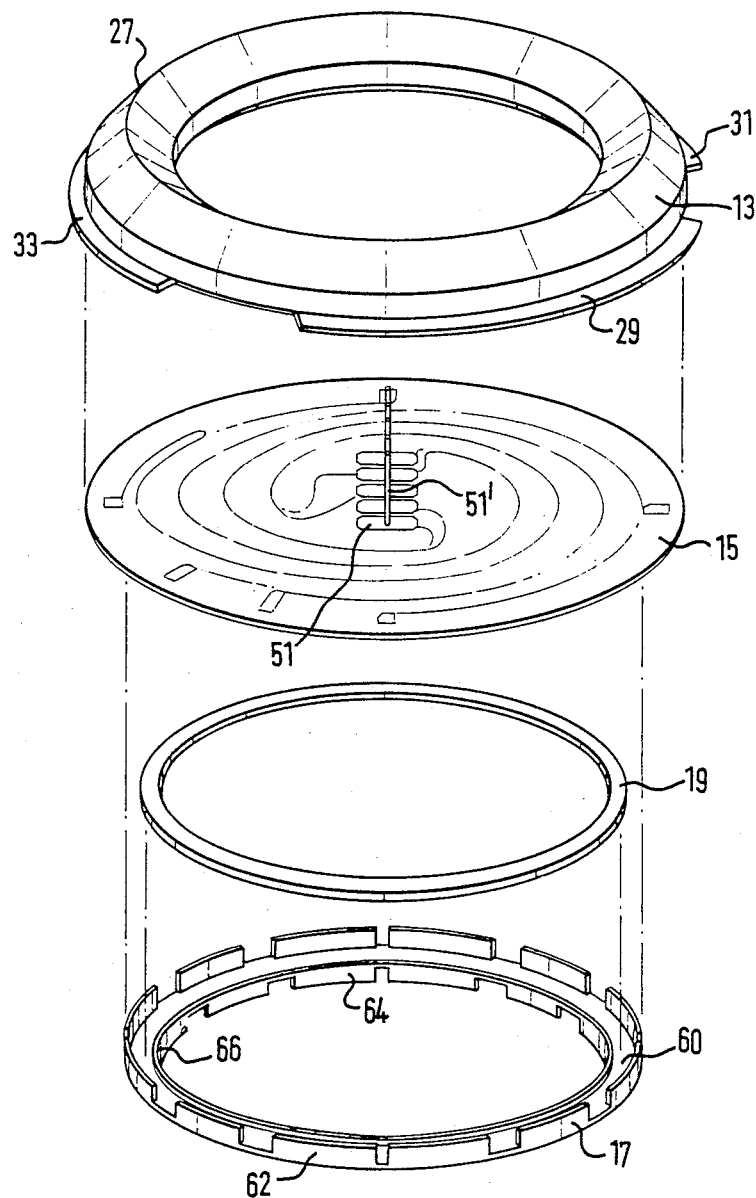
FIG. 3 is an expanded perspective view of some of the components of the embodiment of the invention depicted in FIGS. 1 and 2.
Figure 4:
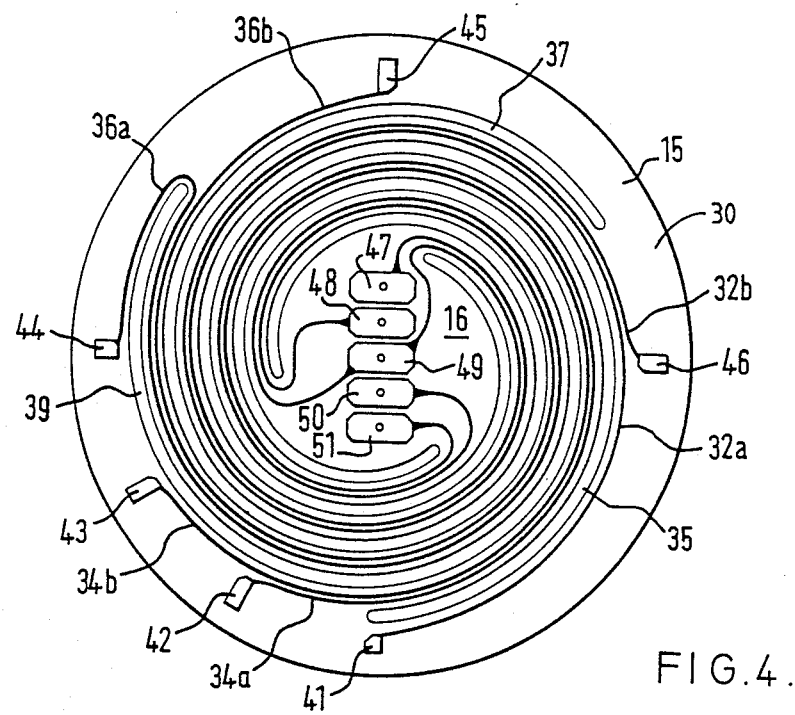
FIG. 4 shows detail of the flexible circuit used in the described embodiment of FIGS. 1 to 3.

The float 13, circuit 15, former 17 and core 19 are better illustrated with reference to FIG. 3.

Figure 2:
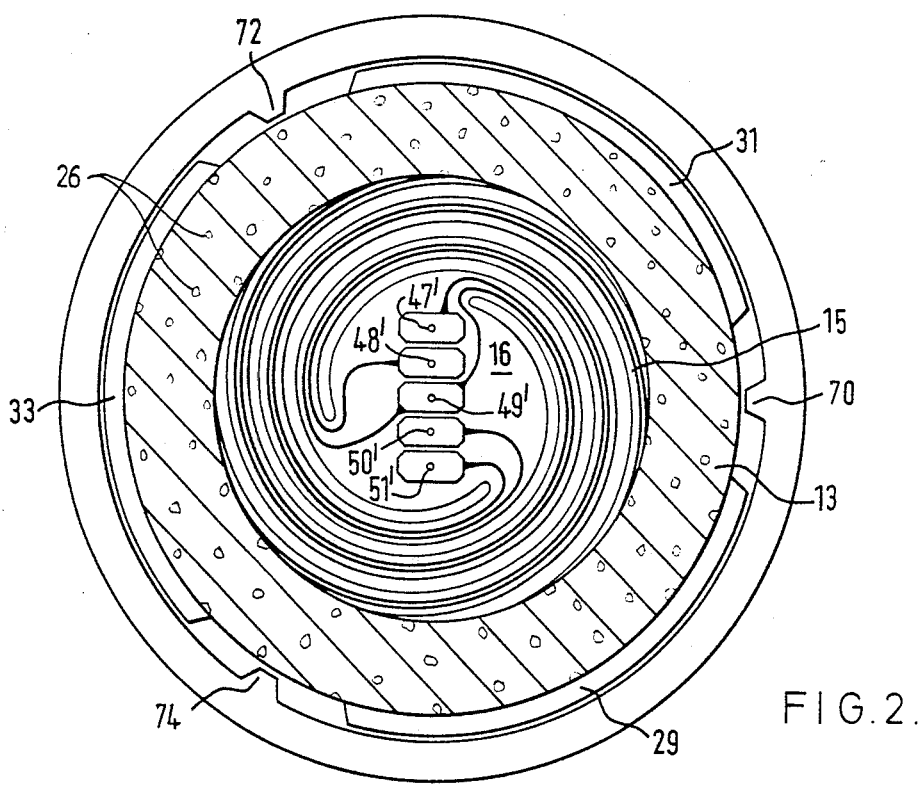
FIG. 2 is a plan view taken through the plane 2—2 of FIG. 1.

The float 13 is formed from material buoyant within the liquid and may be formed from expanded polystyrene or, more preferably, a composite of a plastic material e.g. a vinyl ester and a plurality of hollow glass spheres 26 (glass balloons), the entrapped air within the spheres giving the required buoyancy. However any buoyant material of uniform density may be used. The float 13 is of generally annular form, having a slanted top surface 27, to allow oil displaced onto the float to drain off. Three arcuate ribs 29, 31, 33 are disposed at equal spacing around the periphery of the float 13. With reference to FIGS. 1 and 2, when the float is in position, the ribs 29, 31, 33 are submerged within the liquid and in normal operation lie spaced from the inner side of the receptacle. The body of the float 13 is of a lesser outer diameter than the ribs 29, 31, 33 to reduce the effect of surface tension forces acting between the side of the receptacle 3 and the float 13.

The float 13 is connected to the flexible circuit 15. This flexible circuit is of a similar construction to that disclosed in the aforesaid Great Britain Pat. No. 2107057. The flexible circuit 15 is formed from a thermoset (polyamide) base, preferably from Kapton (trade name) of 50 microns thickness having electrical connections 32a, 32b, 34a, 34b, 36a, 36b, formed from copper upon the base 30 in three spiral pairs, which will be referred to as 32, 34 and 36. The connections may be formed by depositing a uniform copper coating on the base 30 and selectively chemically etching the coating to give the required pattern. Between the spiral pairs, three spiral slots 35, 37, 39 are cut by conventional means.

The flexible circuit 15 provides a flexible connection between outer terminals 41-46 and inner terminals 47-51. The outer terminals 41-46 are connected to the coils of the fluxgate (see below), while the inner terminals 47-51 are attached to connecting members 47'-51' for connection to driving and sensing circuitry.

The former 17 is formed from plastic material and is also of generally annular construction. The former 17 is configured to accept the core 19, which is preferably formed from Mu-Metal (Registered Trade Mark), within a channel 60 and is provided with wall sections 62, 64, 66 having slots disposed therein at regular intervals. In assembly, the core 19 is placed within the slot 60 and the coils 21a-b, 22a-b and 23a-h are wound around the former 17 by conventional means. As illustrated in FIG. 5, the coils are configured so as to provide two orthogonally disposed pairs of connected sense coils 21a, 21b and 22a, 22b, and eight drive coils 23a-23h connected together and disposed between the sensing coils at equal spacing. The terminals of coils 23a, 23h are connected to the outer terminals 42, 43 of the flexible circuit 15, by low temperature soldering, with the terminals from coils 21a, 21b, 22a, 22b being connected to the outer terminals 44, 46, 45, 41 in a similar manner. Although the terminals from the coils are shown non-symmetrically arranged, these terminals may be disposed symmetrically about the former 17, for example in three equispaced pairs.

The drive signals for the sense coils are then applied through the inner terminals 50, 51, with the sensing coil output being provided between the inner terminals 47 and 49 and 48 and 49. The terminals 47'-51' may be connected to any conventional sensing and drive circuit for this application with the number of turns of the sense and drive coils being chosen accordingly.

In use, the direction sensor 11, as assembled, is secured, at the central land 16 of the flexible circuit to the receptacle 3, being clamped between the receptacle halves 5, 7, between washers 71, 73. The receptacle 3 is then mounted within, for example, a ship or other object whose direction it is desired to sense and is aligned at a predetermined orientation.

If subsequent movement of the ship causes the receptacle to tilt relative to the horizontal, this will cause the liquid 9 within the receptacle 3 to adjust its position so that the surface 10 thereof remains in the horizontal plane. This will cause movement of the float 13, which will tend to retain the direction sensor 11 in a horizontal aspect. The flexible circuit 15 will allow tilting movement of the direction sensor 11 relative to the receptacle 3 out of the horizontal plane but will, due to its spiral construction, resist any twisting movement of the sensor relative to the receptacle 3 in the horizontal plane, so as to retain the direction sensor 11 at a predetermined directional orientation relative to the receptacle and thus to the ship. The flexible circuit 15 also acts to locate the direction sensor 11 laterally within the receptacle, preventing any direct contact between the sensor 11, in particular the ribs 29, 31, 33 of the float 13 and the receptacle 3 which could generate frictional forces to disturb the direction sensor from horizontal.

If large rotational forces are present, for example if the ship is sailing in rough seas, the flexible circuit can become entangled with itself and thus not provide the desired resistance to twist. In order to prevent this, the gaps between the annular ribs 29, 31, 33 of the float 13 are arranged to cooperate with projections 70, 72, 74 of the receptacle to prevent excessive rotation of the float, and consequently of the direction sensor 11 relative to the receptacle.

Figure 6:
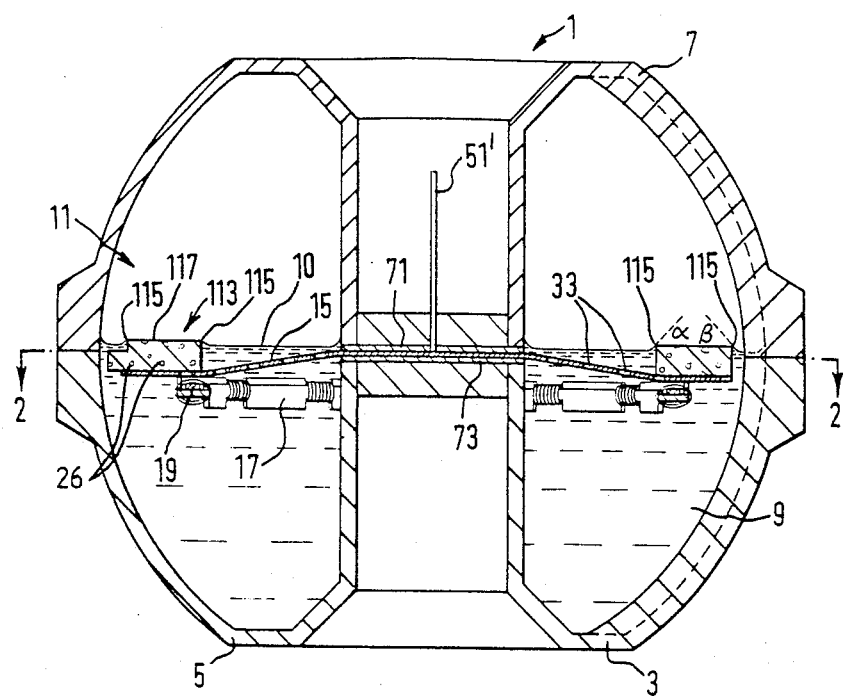
FIG. 6 is a sectional view of a second embodiment of the invention having a float of a modified form.
Figure 7:
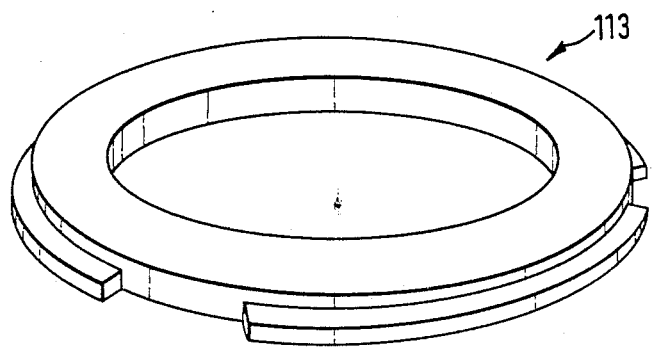
FIG. 7 is a perspective view of the float of FIG. 6.

FIGS. 6 and 7 show a second embodiment of the invention which includes a modified float 113. The float 113 is of similar form to that shown in FIGS. 1 and 3 except that it is of reduced height and is arranged so that the floating assembly is only marginally buoyant. In this case the strong adhesion tendency of particular types of liquid 9, for example silicone oil, may be used to advantage to stabilize the top surface 117, of the float 113. The stabilizing action results from the tendency of the liquid surface to adhere to the sharp edges 115 of the float 113. If any displacement from horizontal occurs, the angles α, β adopted by the liquid surface 10 adjacent to the float differ on opposite sides of the float 113, causing a restoring torque by the surface tension of the liquid. The liquid surface 10 can be likened to an elastic membrane.

In static conditions, the top surface 117 of the float 113 remains free of liquid, apart from a surface film. The float 113 may become flooded following agitation of the assembly, but recovers rapidly and with no significant effect on accuracy.

I claim:

1. A direction sensing device, comprising:
   a receptacle;
   a liquid at least partially filling said receptacle;
   a direction sensor within said receptacle, said direction sensor being buoyant in said liquid; and
   movement regulating means for causing said direction sensor to be free to move so as to remain in a horizontal plane but to be in all other respects constrained to follow the movement of said receptacle, such that when said direction sensing device is in operation, said direction sensor is free to move so as to remain in a horizontal plane but to be in all other respects constrained to follow the movement of said receptacle.

2. A direction sensing device as claimed in claim 1 wherein said movement regulating means comprises an alignment member connected to said receptacle.

3. A direction sensing device as claimed in claim 2 wherein said alignment member is formed from a flexible material.

4. A direction sensing device as claimed in claim 3 wherein said alignment member comprises at least one spiral connection to said receptacle.

5. A direction sensing device as claimed in claim 4 wherein said alignment member comprises three concentric spiral connections to said receptacle.

6. A direction sensing device as claimed in claim 1 wherein said direction sensor includes a fluxgate.

7. A direction sensing device as claimed in claim 6 wherein said fluxgate comprises a magnetically permeable core; drive coil means wound around a first portion of said magnetically permeable core; and first and second orthogonally disposed sensor coil means wound around a second portion of said magnetically permeable core.

8. A direction sensing device as claimed in claim 6 wherein said fluxgate is structured to be submerged within said liquid.

9. A direction sensing device as claimed in claim 1 wherein said direction sensor includes a float for making said direction sensor buoyant in said liquid.

10. A direction sensing device as claimed in claim 9 wherein said liquid has a free surface and said float has a protruding portion which protrudes through said free surface of said liquid, said protruding portion of said float being spaced from said receptacle.

11. A direction sensing device as claimed in claim 9 wherein said liquid has a free surface and said float has a portion having a plurality of surfaces, said portion of said float having a plurality of surfaces being arranged to protrude through said free surface of said liquid, said plurality of surfaces of said portion of said float being non-coplanar with said free surface of said liquid.

12. A direction sensing device as claimed in claim 9 wherein said liquid has a free surface and said float is structured to be disposed within said liquid such that said float does not protrude through said free surface of said liquid.

13. A direction sensing device as claimed in claim 9 wherein said float is formed from expanded polystyrene.

14. A direction sensing device as claimed in claim 9 wherein said float is formed as a composite of a plastic material having a plurality of hollow members.

15. A direction sensing device as claimed in claim 14 wherein said plurality of hollow members are formed from glass.

16. A direction sensing device as claimed in claim 1 wherein said receptacle has at least one projection and said direction sensor has at least one rib; said movement regulating means comprising said at least one projection member and said at least one rib cooperating to restrain said direction sensor from rotational movement exceeding a predetermined maximum.

17. A direction sensing device as claimed in claim 16 wherein said projection is provided integral with said receptacle.

18. A direction sensing device as claimed in claim 1 wherein said receptacle and said direction sensor are of generally annular construction.

19. A directional sensing device, comprising:

a receptacle having an inside surface of generally annular shape, said inside surface having at least one projection extending therefrom;

a liquid at least partially filling said receptacle;

a generally annularly shaped direction sensor received in said receptacle and buoyed by said liquid, said direction sensor comprising:

a base;

an alignment member having at least one flexible spiral shaped portion extending from said receptacle to said base, said alignment member resisting rotational movement by said base;

a fluxgate attached to said base having a magnetically permeable core;

drive coil means wound around a first portion of said magnetically permeable core; and first and second orthogonally disposed sensor coil means wound around a second portion of said magnetically permeable core; and a float attached to said base for buoying said direction sensor in said liquid, said float having a peripheral surface, said peripheral surface having at least one rib attached thereto, such that said at least one rib of said float and said at least one projection of said receptacle cooperate to restrain said base from rotational movement exceeding a predetermined maximum.

* * * * *

UNITED STATES PATENT AND TRADEMARK OFFICE
CERTIFICATE OF CORRECTION

PATENT NO. : 4,791,730

DATED : December 20, 1988

INVENTOR(S) : Michael John Gill

It is certified that error appears in the above-identified patent and that said Letters Patent is hereby corrected as shown below:

Column 1, line 42, delete the colon ":".

Column 3, line 43, before sensor, insert ---- direction ----.

Column 3, line 63, delete the comma ",".

Signed and Sealed this

Twenty-fifth Day of July, 1989

*Attest:*

DONALD J. QUIGG

*Attesting Officer*  *Commissioner of Patents and Trademarks*